UNITED STATES PATENT OFFICE.

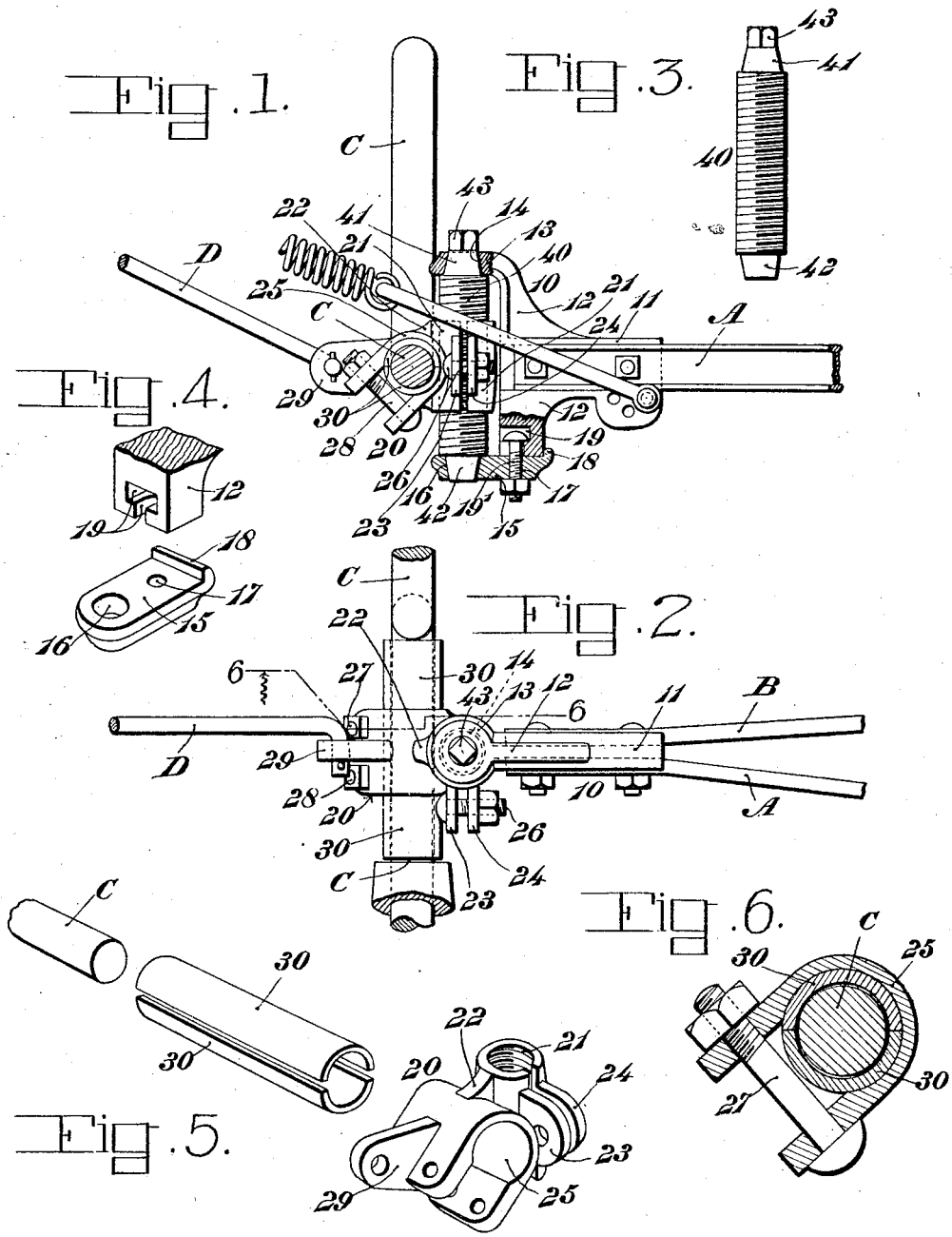

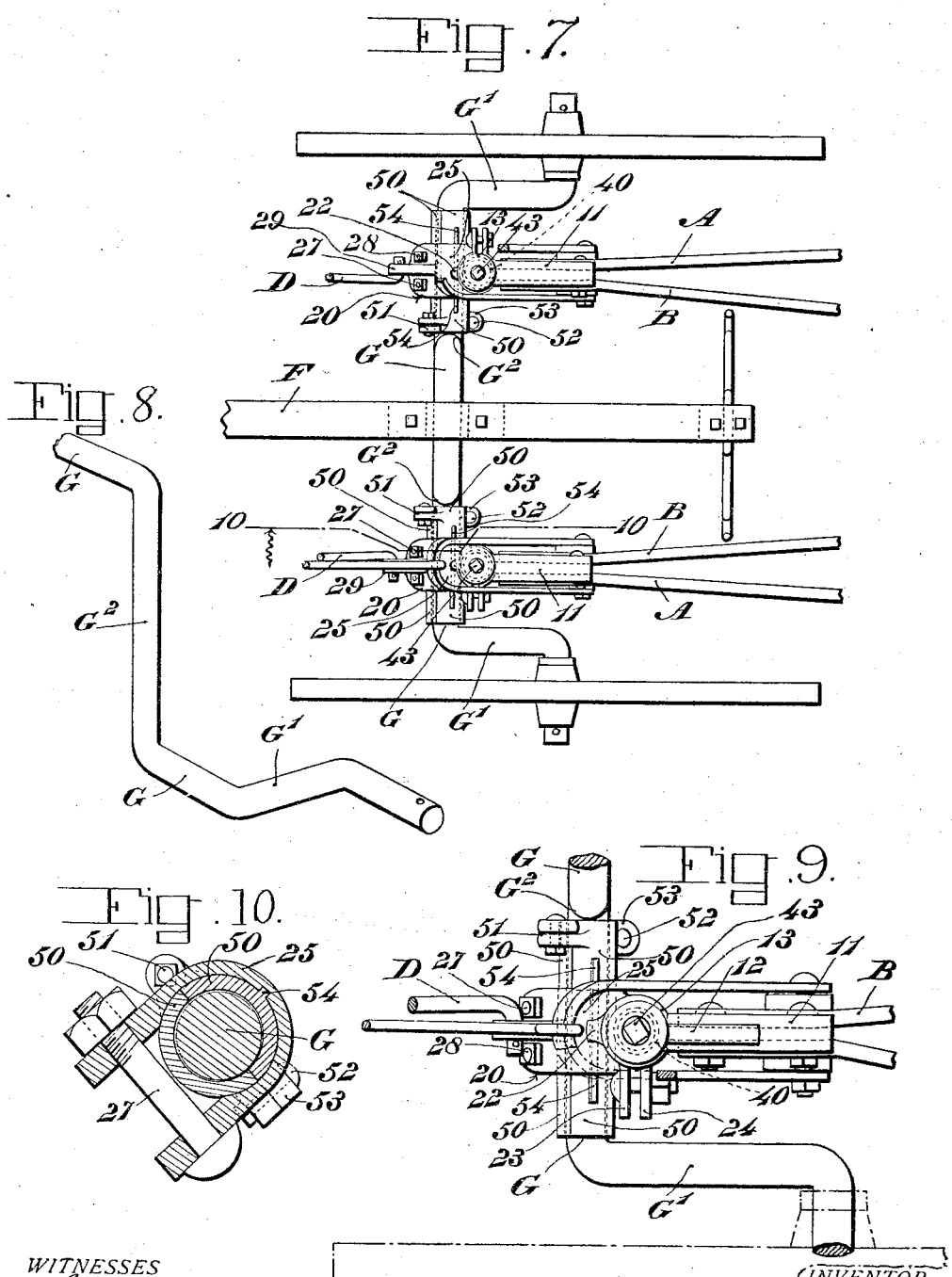

SPENCER HERMANUS PHELPS, OF EVANSVILLE, INDIANA, ASSIGNOR TO BLOUNT PLOW WORKS, OF EVANSVILLE, INDIANA, A CORPORATION OF INDIANA.

CULTIVATOR GANG CONNECTION.

1,109,175.  Specification of Letters Patent.  Patented Sept. 1, 1914.

Application filed April 23, 1913. Serial No. 763,026.

*To all whom it may concern:*

Be it known that I, SPENCER HERMANUS PHELPS, a citizen of the United States of America, residing at Evansville, in the county of Vanderburg, in the State of Indiana, have invented certain new and useful Improvements in Cultivator Gang Connections, whereof the following is a specification.

This invention relates to cultivator couplings which connect the plowbeams of gang plows with the axle or frame and allow lateral and vertical swing of the plows when in use. Such couplings usually have means for lateral adjustment on the axle to regulate the distance between the plows or gangs of plows and means for vertical adjustment of the beam connection to adapt the plows to take a deeper or shallower cut.

The invention relates more specifically to improved means for effecting vertical locked adjustments of the coupling members at different heights while maintaining a continuous operative connection of said members during the adjusting operation.

The invention also relates to the peculiar construction of the coupling whereby it is simplified.

Figure 1 represents a side elevation of one form of this gang connection. Fig. 2 represents a plan view thereof. Fig. 3 represents a side elevation of the worm adjuster thereof whereby the plowbeams may be readily raised and lowered and retained in their adjusted position. Fig. 4 represents detached parts of the gang coupling constituting a part of this gang connection. Fig. 5 represents in perspective the axle coupling constituting a part of this gang connection, the segmental sleeve on which it is adjusted and the axle on which the sleeve is mounted, these parts being detached and separated. Fig. 6 represents a transverse section of the axle-coupling, sleeve and axle on line 6—6 of Fig. 2, looking in the direction indicated by the arrow, showing the sleeve in loose connection on the axle and the axle-coupling or clip in tight connection with the sleeve. Fig. 7 represents in plan a fragment of a cultivator embodying this gang connection in conjunction with a rearwardly cranked axle. Fig. 8 represents a perspective view of a fragment of the arched crank axle of the cultivator of Fig. 7. Fig. 9 represents a plan of this gang connection adjusted in the loop of said cranked axle. Fig. 10 represents a transverse section of the axle coupling of this embodiment on line 10—10 of Fig. 7, looking in the direction indicated by the arrow.

The same reference numbers indicate corresponding parts throughout the different figures, round numbers being used for the principal elements and intermediate numbers for the subordinate features thereof.

In the form of embodiment of this invention illustrated in Figs. 1 to 6 this gang connection comprises a gang coupling 10 attachable to the plowbeams A and B of a gang of plows of a cultivator, an axle coupling 20 horizontally adjustable on a sleeve 30 loose on the axle C of the cultivator, and a vertically movable worm shaft 40 journaled in said gang coupling 10, adjustable vertically by its own rotation in said axle coupling and operative to raise or lower said plowbeams in unison with its own rise and fall.

The gang coupling 10 comprises a horizontal rearwardly extending attaching plate 11 and a forked bracket 12 integral therewith. The plowbeams A and B are secured to opposite faces of said plate 11, preferably between parallel ribs thereof by means of bolts in the usual manner. The upper horizontal arm 13 of said forked bracket is preferably integral with the body thereof and is provided with a journal bearing 14. The lower arm 15 of said forked bracket is detachable from the body thereof and provided with a journal bearing 16 in alinement with the bearing 14. This detachable arm 15 is also provided with a bolt hole 17 and at its rear end with a lip 18 which engages the rear face of the body of the bracket 12 as shown in Fig. 1. The lower end of the body of the bracket 12 is provided with a T-shaped slot 19 adapted to receive the head and shank of a bolt 19' which passes through the bolt hole 17 and serves to clamp the arm 15 to the body of said bracket as shown clearly in Fig. 1.

The vertically adjustable worm shaft 40 has a spiral screw-thread along its body, journals 41 and 42 at its opposite ends adapted to turn in the bearings 14 and 16 of the gang coupling 10 and a rotation means preferably in the form of a projection 43 and adapted to be engaged by a wrench for turning the worm shaft in its bearings.

The sleeve 30 fits loosely on the axle C and is adapted to turn thereon. This sleeve is preferably constructed in sections.

The axle coupling 20 comprises a vertical sleeve or tubular clamp 21 having an interior screwthread adapted to fit the worm shaft 40, a horizontal tubular clamp 25 adapted to fit the sleeve 30 and a web 22 integrally connecting said clamps. The clamp 21 is in the form of a split sleeve and is provided with a screwthread which corresponds with the screwthread of said worm shaft. This split sleeve 21 is provided at its split edges with ears 23 and 24 having bolt holes for receiving a clamping bolt 26 for tightening the clamp around the worm shaft. The jaws of the horizontal clamp 25 are provided with bolt holes for receiving clamping bolts 27 and 28 and for holding the axle clamp in adjusted position on the horizontal sleeve 30. The upper lip of the horizontal clamp 25 is provided with a lug 29 to receive a brace or supporting rod D leading to the whiffletree support E connected with the draft bar F.

In Figs. 1 to 6 this gang connection is illustrated as applied to an ordinary arched axle C and in Figs. 7 to 10 it is shown in connection with a balanced axle G in which the wheels are supported on rearwardly extended crank bends G'.

In the embodiment shown in Figs. 7 to 10, the sectional axle sleeve 50 corresponding to the axle sleeve 30 of the other form is made in sections which are connected on one side by means of a hinge 51 and on the other side by means of perforated lugs 52 through which a clamping bolt 53 is passed. In this case the sleeve 50 is provided with a spline 54 and the axle clamp with a groove engaged by said spline. This sleeve 50 is placed on the axle G between the cranked end G' and the upright G² of the arch and is held in place endwise by these bends of the axle.

In the use of this invention the plowbeams may be adjusted higher or lower and locked in adjusted position without the use of a multiplicity of parts and without disengagement of the coupling members. When it is desired to adjust the plowbeams higher or lower, the locking bolt 26 of the clamping sleeve 21 is loosened sufficiently to permit the screwshaft 40 to turn in said sleeve. Then a wrench is placed in engagement with the angular projection or rotation means 43 at the upper end of said screwshaft and said shaft is turned toward the left for lowering the plowbeams or toward the right for raising them. This turning of the screwshaft raises or lowers said shaft bodily while the clamping sleeve 21 remains stationary. The forward ends of the plowbeams move up or down in unison with the raising and lowering of said screwshaft. When the screwshaft is at the upper height in the sleeve to secure a desired adjustment of the plowbeams, the locking bolt 26 is operated to tighten the clamping sleeve on said screwshaft, whereby any accidental turning thereof is prevented during the lateral swing of the plowbeams.

The coupling thus constructed is simple in construction, composed of few parts, easily operated to effect vertical locked adjustments of the plowbeams and maintains the parts of the coupling in continuous operative connection during the adjusting operation.

I claim as my invention:

1. A cultivator coupling comprising a vertical sleeve having an interior screwthread and provided with attaching means for a swiveled connection with a cultivator frame, an elongated vertically movable rotary screwshaft engaging said sleeve and adjustable up or down therein by rotation in either direction respectively, and a bracket provided with attaching means for connection with a cultivator plowbeam and with attaching means for a swiveled connection with said vertically movable screwshaft.

2. A cultivator coupling comprising a vertical sleeve having an interior screwthread and provided with attaching means for a swiveled connection with a cultivator frame, an elongated vertically movable rotary screwshaft engaging said sleeve and adjustable up or down therein by rotation in either direction respectively and provided with rotation means, and a bracket provided with attaching means for connection with a cultivator plowbeam and with attaching means for a swiveled connection with said vertically movable screwshaft.

3. A cultivator coupling comprising a vertical sleeve having an interior screwthread and provided with attaching means for connection with a cultivator frame, a bracket provided with attaching means for connection with a cultivator plowbeam and with journal bearings disposed one above the other, an elongated vertically movable rotary screwshaft engaging said sleeve and adjustable up or down therein by rotation in either direction respectively and provided with end journals engaging said bearings.

4. A cultivator coupling comprising a vertical sleeve having an interior screwthread and provided with attaching means for connection with a cultivator frame, a bracket provided with attaching means for connection with a cultivator plowbeam and with journal bearings disposed one above the other, an elongated vertically movable rotary screwshaft engaging said sleeve and adjustable up or down therein by rotation in either direction respectively and provided with end journals engaging said bearings and with rotation means.

5. A cultivator coupling comprising a vertical split clamping sleeve having tightening means, an interior screwthread and attaching means for a swiveled connection with a cultivator frame, an elongated vertically movable rotary screwshaft engaging said sleeve and adjustable up or down therein by rotation in either direction respectively, and a bracket provided with attaching means for connection with a cultivator plowbeam and with attaching means for a swiveled connection with said vertically movable screwshaft.

6. A cultivator coupling comprising a vertical split clamping sleeve having tightening means, an interior screwthread and attaching means for a swiveled connection with a cultivator frame, an elongated vertically movable rotary screwshaft engaging said sleeve and adjustable up or down therein by rotation in either direction respectively and provided with rotation means, and a bracket provided with attaching means for connection with a cultivator plowbeam and with attaching means for a swiveled connection with said vertically movable screwshaft.

7. A cultivator coupling comprising a bracket having a vertical body provided with a T-shaped slot at one end, an attaching plate attachable to a plowbeam, a horizontal arm integral with said body at one end thereof, a detachable horizontal arm disposed at the other end of said body and provided with a lip adapted to engage the outer face of said body and with a bolt hole, and a bolt engaging said T-shaped slot and said bolt hole for rigidly securing said detachable arm to said body, said horizontal arms having journal bearings.

8. A cultivator coupling comprising a coupling member consisting of a horizontal clamp and a vertical clamping sleeve integral therewith and provided with an interior screwthread and with tightening means.

9. The combination in a cultivator of an arched and cranked axle, axle sleeves loose on said axle between the arched and cranked portions thereof, axle clips adjustable on said axle sleeves and provided with vertical screwthreaded sleeves, plows, brackets attached to the plowbeams of said plows, and elongated vertically movable rotary screwshafts journaled in said brackets, engaging said sleeve and adjustable up or down therein by rotation in either direction respectively.

10. The combination in a cultivator of an arched and cranked axle, axle sleeves loose on said axle between the arched and cranked portions thereof, axle couplings adjustable on said axle sleeves and provided with vertical split screwthreaded sleeves having clamping means, plows, brackets attached to the plowbeams of said plows, and elongated vertically movable rotary screwshafts journaled in said brackets, engaging said sleeve and adjustable up or down therein by rotation in either direction respectively.

11. The combination in a cultivator of an arched and cranked axle, a sleeve held loose on said axle by and between the arched and cranked portions thereof, and a coupling whereof one member is adjustable on said sleeve and the other member connected with the plowbeam.

SPENCER HERMANUS PHELPS.

Witnesses:
H. J. GRIMMEISSEN,
CHAS. A. NOLTE.

---

Copies of this patent may be obtained for five cents each, by addressing the "Commissioner of Patents, Washington, D. C."